JOHN B. AUSTIN, OF CLEVELAND, OHIO.

PROCESS OF UNITING COPPER TO STEEL.

No Drawing. Application filed August 18, 1924. Serial No. 732,871.

*To all whom it may concern:*

Be it known that I, JOHN B. AUSTIN, a citizen of the United States, and a resident of Cleveland, in the county of Cuyahoga and State of Ohio, have invented a certain new and useful Improvement in Processes of Uniting Copper to Steel, of which the following is a specification.

My invention relates to the art of welding or brazing and is especially concerned with a process of attaching or uniting copper bonds to steel rails.

The chief object of the invention is to provide a new and improved process of electric arc welding or brazing copper to steel.

Another object is to provide an improved process of uniting nonferrous metals to ferrous metals by means of a heating flame.

Another object is to provide a process for uniting copper to steel in a manner to prevent the formation of appreciable amounts of hard, brittle material between the two metals and to obtain a substantially non-porous junction between the copper and the steel.

My improved process will be hereinafter described in detail with particular reference to the joining of copper to steel. It is to be understood, however, that it is not limited to these two metals or compositions, but that these terms as used herein have been adopted for the sake of clearness and not as limitations or definitions of the scope of my invention. By the term "copper" as herein used I mean to include copper, copper base alloys, compositions and articles and any and all metals having properties which are similar or equivalent to copper for the purpose of my process. By the term "steel" as herein used I mean steel, iron in its various forms and in general ferrous base alloys, compositions, and articles having properties similar or equivalent to steel for the purpose of this process. Certain features or steps of the process are sufficiently broad to embrace various other metals, namely those features or steps which will result in dense, nonporous metal or castings and in desirable or improved physical properties in either or both of the metals. Accordingly I desire my invention to be inclusive of all metals, alloys or compositions to which this process can be adapted with the attendant highly improved physical properties above briefly referred to and hereinafter to be set forth in detail.

In order that my improved process may be understood and practiced I will now describe it as carried out in joining copper bonds to steel railway rails, from which description the general principles of the process and its application to other articles, metals and compositions will be readily apparent to those skilled in the art.

My process in many respects resembles the process of joining copper to steel as disclosed in U. S. Letters Patent 1,183,992 and 1,183,993. That process which comprises melting copper adjacent a rail in a carbon lined mold by means of the electric arc results in a junction between the copper and steel which is exceedingly strong mechanically and highly electrically conductive as compared with junctions of copper to steel produced by other previously known processes.

My process retains the many advantages of that process and possesses certain additional advantages which together result in substantially non-porous junctions between the copper and steel which are greatly superior in mechanical strength and electrical conductivity to such junctions heretofore obtainable. Furthermore the copper forming such a junction and comprising in some cases a large bond head is dense, fine grained, ductile and substantially nonporous which has been a structure difficult, if not impossible, to obtain heretofore, so far as I am aware. Also the structure of the steel adjacent the point of junction with the copper often becomes greatly improved since it is, in effect, refined with the consequent alteration of the normal pearlitic structure to a sorbitic one which is harder and usually stronger and more ductile than pearlite.

An additional and important advantage is that no appreciable amount of hard, brittle constituent is formed between the copper and steel. The present processes tend to produce varying amounts of this constituent which is believed to be mainly an alloy of iron and copper. It is harder than either the steel or the copper, is brittle and often contains small cracks which, it is believed, may result in cracking of the adjacent rail.

I believe these improved physical properties and characteristics are attained largely by the particular steps employed in the process which include first, bringing a quantity heating the copper, while maintaining the heating flame out of contact with the steel, to eliminate gases from the copper and cause it to unite with the steel.

By "heating flame" I mean any flame capable of melting copper and achieving the objects of my process, such as gas flames or the electric arc.

Due to directing the arc out of contact with the steel at all times and to directing it on the copper, the steel is not subjected to such intense heat as is the case where the arc plays directly on the steel. As a result of this indirect heating or decreased temperature the structure and physical properties of the steel adjacent the bond head are often favorably altered. The characteristic steel structure consisting mainly of pearlite is converted into sorbite with consequent increased hardness and usually also ductility and tensile strength.

In attaching copper bonds to the base of rails or to substantially horizontal surfaces the process may be conveniently practiced as follows: A suitable mold is positioned on the said surface about a bond end and an arc is drawn between a movable electrode and the bond or a filler rod in contact with the steel, or momentarily between the steel and a movable electrode but if drawn from the steel it is not allowed to remain long enough to melt an appreciable amount of the steel. The arc may also be drawn between two movable electrodes and suitably deflected to melt the copper.

Sufficient copper is then melted to substantially cover or form a film or layer on the steel surface whereupon the arc is brought to bear or directed upon the copper and is applied to all surface portions thereof thereby maintaining the molten copper above its melting point until substantially all gases are eliminated, which condition will be indicated by the unagitated, dead surface thereof. During this heating the copper and steel unite without an appreciable intervening layer of the brittle alloy formerly obtained. Additional copper is gradually added to complete a bond head of the desired size, the molten copper at the same time uniting with the bond end to form an intimate contact with all parts thereof.

In practicing the invention upon bonds to be attached to the head of a steel rail, or to a substantially vertical surface the same general steps are employed. First, the bond is positioned adjacent the rail in a suitable mold, the arc is drawn and preferably a portion of the bond end is melted. The arc is then caused to play or is directed at an angle against the surface of the molten copper to eliminate gases and to sweep or wash the metal up against the side of the rail. The copper becomes united to the rail with a ing been maintained molten for a sufficiently long time and freed from gases. Additional copper to complete the bond head may then be added gradually with continued washing against the rail and the arc is broken when the metal no longer liberates the gases.

It will be seen that whether a bond is being attached to the head, base or other part of a rail, the rail forms a portion of the retaining wall which serves to retain molten metal in contact with the copper of the bond.

This application contains the subject matter of copending application, Serial No. 543,485 filed March 13, 1922, as a joint application of myself and Gilbert E. Doan.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

Having thus described my invention what I desire to secure by Letters Patent is defined by what is claimed.

What is claimed is:

1. The process of uniting one metal or alloy to another of higher melting point which comprises melting a small quantity of the one metal and holding the molten metal in contact with the metal of higher melting point at the location where it is desired to effect a junction, heating the molten metal by directing a heating flame thereon without directing the flame upon the said metal of higher melting point and continuing the heating of the molten metal until the gases are substantially eliminated and a substantially non-porous junction between the two metals is effected.

2. The process of uniting non-ferrous metal to ferrous metal which comprises melting the non-ferrous metal adjacent to the ferrous metal and holding the molten metal in contact therewith at the location where it is desired to effect a junction, heating the molten non-ferrous metal by directing a flame thereon without directing the flame upon the ferrous metal, and maintaining the non-ferrous metal molten until it unites with the ferrous metal and a substantially non-porous junction is formed between the non-ferrous metal and the ferrous metal.

3. The process of uniting copper to ferrous metal which comprises melting the copper adjacent to the ferrous metal and holding the molten copper in contact therewith at the location where it is desired to effect a junction, heating the molten copper by directing a flame thereon without directing the flame upon the ferrous metal, and maintaining the copper molten until the copper unites with the ferrous metal and a substantially non-porous junction is formed between the copper and the ferrous metal.

4. The process of uniting copper to steel which comprises holding molten copper in contact with the steel, directing a heating flame on the molten copper without directing the flame upon the steel, and maintaining the copper molten until the gases are substantially eliminated from the copper and the copper unites with the steel, forming a substantially non-porous junction.

5. The process of uniting copper to steel which comprises melting a small quantity of copper in a suitable mold in contact with the steel, and heating the molten copper by directing a flame directly thereon without directing the flame upon the steel until the gases are substantially eliminated from the copper and the copper unites with the steel, forming a substantially non-porous junction.

6. The process of uniting copper bonds to steel rails which comprises forming a suitable mold cavity about a portion of the copper of the bond adjacent to the rail, melting copper in the casting cavity of the mold, directing a heating flame on the copper without directing the flame on the steel, and maintaining the copper molten until the gases are substantially eliminated and the copper unites with the bond and the steel, forming a substantially non-porous junction between the copper and the steel.

7. The process of uniting a copper bond to a steel rail which comprises forming a suitable mold cavity about the end of a bond adjacent to the rail, melting copper in the casting cavity of the mold, directing a flame on the copper, and heating the molten copper without directing the flame on the steel, adding additional copper to the molten copper sufficient to form the bond head while continuing the heating of the molten copper in contact with the steel by directing a flame thereon without directing it on the steel until the gases are substantially eliminated from the copper and the copper unites with the bond and steel, forming a substantially non-porous junction between the copper and the steel.

8. The process of uniting a copper bond to a steel rail which comprises forming a suitable mold cavity about the end of a bond adjacent to the rail, melting copper in the casting cavity of the mold by means of an electric arc, directing the arc on the molten copper and heating the molten copper without directing the arc on the steel, adding additional copper to the molten copper sufficient to form the bond head while continuing the heating of the molten copper by directing the arc thereon until the gases are substantially eliminated and the copper unites with the bond and the steel, forming a substantially non-porous junction between the copper and the steel.

9. The process of uniting a copper bond to a steel rail which comprises forming a suitable mold cavity about the end of a bond adjacent to the rail, melting copper in the casting cavity of the mold and melting the end of the bond in the mold by means of an electric arc, directing the arc on the molten copper and heating the molten copper without directing the arc on the steel, adding additional copper to the molten copper sufficient to form the bond head while continuing the heating of the molten copper by directing the arc thereon until the gases are substantially eliminated and the copper unites with the bond and the steel, forming a substantially non-porous junction between the copper and the steel.

In testimony whereof I affix my signature this 14th day of August, 1924.

JOHN B. AUSTIN.